(12) United States Patent
Helt

(10) Patent No.: US 9,992,486 B2
(45) Date of Patent: Jun. 5, 2018

(54) METHOD OF ENHANCED ALIGNMENT OF TWO MEANS OF PROJECTION

(71) Applicant: HIGHLANDS TECHNOLOGIES SOLUTIONS, Valbonne (FR)

(72) Inventor: Francois Helt, Seigy (FR)

(73) Assignee: Highlands Technologies Solutions, Valbonne (FR)

( * ) Notice: Subject to any disclaimer, the term of this patent is extended or adjusted under 35 U.S.C. 154(b) by 134 days.

(21) Appl. No.: 15/118,150

(22) PCT Filed: Feb. 13, 2014

(86) PCT No.: PCT/FR2014/050294
§ 371 (c)(1),
(2) Date: Aug. 11, 2016

(87) PCT Pub. No.: WO2015/121542
PCT Pub. Date: Aug. 20, 2015

(65) Prior Publication Data
US 2017/0180714 A1    Jun. 22, 2017

(51) Int. Cl.
*H04N 13/04* (2006.01)
*H04N 9/31* (2006.01)

(52) U.S. Cl.
CPC ....... *H04N 13/0425* (2013.01); *H04N 9/3147* (2013.01); *H04N 13/0459* (2013.01)

(58) Field of Classification Search
CPC ........... H04N 13/0425; H04N 13/0459; H04N 9/3147
USPC ............... 353/30, 48, 70; 348/135, 181, 51
See application file for complete search history.

(56) References Cited

U.S. PATENT DOCUMENTS

| | | | | |
|---|---|---|---|---|
| 5,847,784 A | * | 12/1998 | Finnila | H04N 9/12 345/1.3 |
| 8,251,512 B2 | * | 8/2012 | Adkins | H04N 9/3147 348/746 |
| 8,317,334 B2 | * | 11/2012 | Aufranc | G03B 21/00 353/122 |

(Continued)

FOREIGN PATENT DOCUMENTS

WO    2013/057714 A1    4/2013

*Primary Examiner* — Thai Tran
*Assistant Examiner* — Stephen Smith
(74) *Attorney, Agent, or Firm* — Drinker Biddle & Reath LLP

(57) ABSTRACT

An alignment, on a first projector, of a second projector, including: activating the projectors to project respective circles; transmitting projected image data from pictures of the projections to an analysis device that identifies respective centers of the projected circles and transmits adjustment commands the second projector to make the projected circle centers coincide. The analysis device: identifies at least one first and one second pair of projected-image zones, each zone of a pair including an arc of a circle, and the zones, pairwise, being spaced a maximum distance apart; identifies luminous intensity extrema in respective profiles of spatial distribution of luminous intensity; deduces spatial co-ordinates of points corresponding to said intensity extrema; defines spatial co-ordinates of the medium between the two points of the first pair and of the medium between the two points of the second pair, to deduce therefrom spatial co-ordinates of the center of the circle.

17 Claims, 3 Drawing Sheets

(56) References Cited

U.S. PATENT DOCUMENTS

| | | | | |
|---|---|---|---|---|
| 2007/0273795 A1* | 11/2007 | Jaynes | ................ | H04N 9/3147 348/745 |
| 2008/0062164 A1* | 3/2008 | Bassi | .................. | H04N 9/3147 345/214 |
| 2011/0069281 A1* | 3/2011 | Redmann | ........... | H04N 13/0425 353/7 |
| 2011/0255057 A1* | 10/2011 | Becouarn | ............... | G02B 27/01 353/31 |
| 2013/0050504 A1* | 2/2013 | Safaee-Rad | .............. | G09G 5/02 348/181 |
| 2013/0342816 A1* | 12/2013 | Furui | .................. | G03B 21/147 353/69 |

* cited by examiner

METHOD OF ENHANCED ALIGNMENT OF TWO MEANS OF PROJECTION

CROSS-REFERENCE TO RELATED APPLICATIONS

This application is the U.S. national phase of the International Patent Application No. PCT/FR2014/050294 filed Feb. 13, 2014, the entire content of which is incorporated herein by reference.

BACKGROUND

The present invention relates to a technique for aligning a second projection means to a first projection means.

It may be desirable to align two (or more) cinema projectors in order to obtain the best superimposed projections on the screen. Such alignment is done to increase the level of light on large screens, or for simultaneous "right-eye left-eye" stereoscopic projection in which the images for each eye are assigned to different projectors.

Alignment may also be used to achieve correctly superimposed red, green, and blue images for a given projector. High-end electronic projectors with these three components allow adjusting the superposition (or convergence) of the three primaries by adjusting the orientation of the three imaging systems. Collimation of the three primaries also requires aligning the three primary images projected. This adjustment is not motorized in the present state of the art.

Aligning two projectors is usually a tedious task that requires two people: the projectionist and one other person in the auditorium near the screen. This adjustment is currently manual, and is done as follows: the projectionist projects the same pattern from both projectors, while the person in the auditorium observes the distance between the two projected images on the screen, and uses signals to communicate the correction to be made. The projectionist changes the position of the second projector based on this information (the first one serving as the reference position), until an alignment is obtained that seems satisfactory to the observer. If the projector has a remote control including horizontal and vertical movement of the projected image, the projectionist can then be close to the screen and control the operation manually.

It is even more tedious to adjust the convergence, because the operator works with screws that move the planes of the imaging systems in all three dimensions (rotation and tilt on two axes). The operator must constantly switch between looking at the system alignment screws, which are brightly lit by a lamp, and the screen which is much less brightly lit.

SUMMARY

The present invention improves the situation.

For this purpose, it proposes a method, implemented by computer means, of aligning on a first projection means at least a second projection means, the method comprising the steps of:
activating the first and second projection means so that each one projects on a screen an image pattern comprising a circle on a uniform contrasting background,
capturing an image of the projections by a sensor, and transmitting the projected image data to an analysis device,
in the analysis device, identifying the centers of the respective circles of the projections and sending adjustment commands to the second projection means so that the circle center of the image projected by the second means coincides with the circle center of the image projected by the first means.

In particular, the method includes a determination of the respective positions of said circle centers, comprising, for each circle, the following steps implemented by the analysis device:
identifying at least a first and a second pair of projected image regions, each region in a pair containing a circular arc, and the regions in each pair being spaced apart by a maximum distance,
determining, for each region, a spatial distribution profile of luminous intensity in a direction that is radial to the circle, in order to identify in said profile a luminous intensity extremum and thus deduce the spatial coordinates of a precise point corresponding to said intensity extremum,
defining the spatial coordinates of the midpoint between the two precise points of the first pair and the midpoint between the two precise points of the second pair, in order to deduce the spatial coordinates of the circle center.

With these arrangements, it is possible to obtain the coordinates of the circle center in a much more precise manner (as discussed below) than simple recognition of a circle, for example recognition by Hough transform. Thus, the alignment of the second projection means with the first projection means is much more fine and precise.

In one embodiment, the circle of the projected images is specifically black in color (or at least very dark) on a uniform colored background, and a minimum luminous intensity is searched for in each of the above profiles. Such an arrangement is less dependent on noise in the image captured by a sensor than if a light circle on a dark background is chosen.

For example, said uniform colored background may be primary green, because this color, which has the greatest brightness, serves as a geometric reference in three-color systems.

In one embodiment, the two images of the two projection means may be projected simultaneously, in particular if the two circles of the respective projections can be identified for example using different colors. However, in a preferred option in which one specific pattern is projected (black circle on a green background, for example), the method alternatively comprises the steps of:
activating the first projection means, with the coordinates being stored of the circle center identified in the image projected by the first means,
then activating the second projection means (the first projection means being turned off), and comparing the coordinates of the circle center identified in the image projected by the second means with the stored coordinates of the circle center of the image projected by the first means, in order to define the adjustment commands for the second means.

To identify the circular arcs in said regions, a prior step is preferably carried out of rough recognition of a circle, in order to identify the pairs of regions. For example, rough circle recognition by Hough transform has yielded good preliminary results.

Determination of the extrema in each region gives much more accurate results, however. One possible embodiment for achieving this is to obtain the respective luminous intensity profiles using Radon projections, followed for example by Lagrange interpolations in order to obtain an extremum point for each profile (as detailed below with reference to FIG. 5).

In one practical implementation:
the regions of the first pair are located at the left and right sides of the circle, and the sum divided by two of the abscissas of the respective precise points of the regions of the first pair provides the abscissa of the circle center in a chosen coordinate system, and the regions of the second pair are located at the lower and upper sides of the circle, and the sum divided by two of the ordinates of the respective precise points of the regions of the second pair provides the ordinate of the circle center in the chosen coordinate system.

Of course, the chosen coordinate system is the same for the two images respectively projected from the first and second projection means (for example, a pixel (0,0) at the lower left corner of a captured image that contains the entire projected pattern, the image capturing means remaining fixed between the two captures of projected images).

In one particular embodiment of said Radon projection, the luminous intensities of the pixels of each region are averaged to construct the profile associated with the region, these pixels being taken in a direction perpendicular to the radial direction of the circle.

For example, if the regions are rectangular, the luminous intensities of the pixels in each region, taken in the largest dimension of the rectangle forming the region, are summed to construct the profile associated with the region (without necessarily needing to calculate an average of these intensities in the case of rectangular regions).

In one application, the first and second projection means may be two projectors in stereoscopic cinematography.

In a variant in which the second projection means is arranged to project an image coincident with and superimposed on an image projected by the first projector, in particular to reinforce the brightness (or for any other artistic or technical effect), the method of the invention can be implemented for a collimation of the projections from said first and second projection means.

In general, by implementing the method according to the invention, it is possible to control the alignment of a plurality of projection means (typically more than two projectors). The method may thus include aligning at least a third (or more) projection means to the first and/or second projection means, repeating the steps of the method to do so.

For example, again in the context of stereoscopic cinematography, we can consider for example four projection means used for stereoscopic cinematography, with two projection means aligned to each other for each eye, and the pairs of projection means for each eye being further aligned to each other for the stereoscopic vision.

The invention also provides a system for adjusting a second projection means so as to be aligned to a first projection means, comprising, for the implementation of the method according to the invention:

a device for controlling at least the second projection means so as to project onto a screen an image pattern containing a circle, a sensor for capturing a digital image of the projected image, and an analysis device connected to the sensor, for determining the position of the circle center in the projected image and comparing this position to a circle position determined in an image projected by the first projection means, so as to provide alignment adjustment commands for the second means based on said comparison.

Of course, the invention also relates to the analysis device which executes the precise determination of the circle center according to the invention.

The invention also relates to a computer program (and/or a readable storage medium containing the instruction data of such a program), this program comprising in particular the instructions for implementing the method when this program is executed by a processor (for example said analysis device). An example of a general algorithm for such a program is described below, with reference to FIG. 2.

BRIEF DESCRIPTION OF THE DRAWINGS

Other features and advantages of the invention will be apparent upon examining the following detailed description and the accompanying drawings, in which.

DETAILED DESCRIPTION

A specific projection pattern is used in the sense of the invention, associated with a procedure developed for very precisely identifying the geometric alignment of the projected image. The identification element (a circle in a preferred option), which is a component of the projected image, is associated with a position in a digital image captured by a sensor, the precision determined to a precision exceeding a tenth of a pixel by this sensor, and this is done by means of the abovementioned procedure.

For the case of aligning multiple projectors, obtaining accurate positions of the projection allows automatically controlling each additional projector so that the projected images coincide in the best possible manner.

Figure 1:
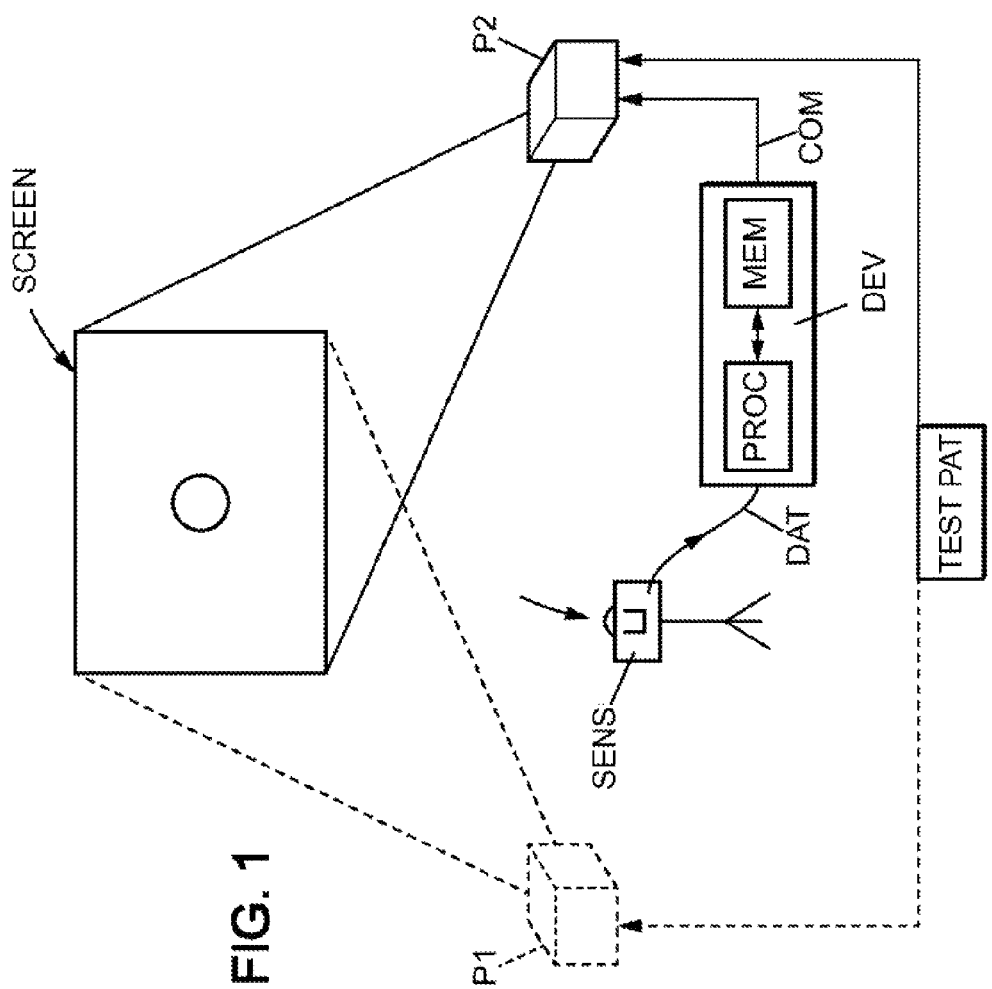
FIG. 1 illustrates an exemplary system according to the invention, suitable for aligning two projectors P1 and P2.

In a first general step illustrated by dashed lines in FIG. 1, a device TEST PAT for controlling the projection of the test pattern controls the projectors, and in particular the first projector P1 so that it projects onto a screen SCREEN a specific reference pattern, for example a black circle on a green background. The device TEST PAT thus activates the reference projector, or "first projector" P1, the other projectors being turned off. The sensor SENS captures an image corresponding to the one in FIG. 3, and transmits the digital data of the projected image (DAT arrow) to a processor PROC of a device DEV in the meaning of the invention which calculates the precise position of the circle center. This position is then stored in the memory MEM of the device. The sensor SENS is, for example, a digital camera, a digital videocamera, or the like.

Next, the projector P1 (illustrated with dashed lines) is turned off, and the controlling device TEST PAT controls the additional projector P2 to be aligned (the above "second projector", represented with solid lines) so that it projects the same image onto the screen SCREEN (black circle on green background).

The second image is captured by the sensor SENS and the same calculation for determining the circle center is executed.

As the projectors were not initially aligned, the new position of the circle center is different. These differences are received and interpreted by the processor PROC of the analysis device DEV in order to deliver, for example in the form of signals addressed to a processing unit of the projector P2, commands controlling the movement of the projector P2 (COM arrow).

Step by step, a translated image is recaptured and the geometric calculation of the position of the circle center is repeated, until the distance between the obtained position and the reference position of the circle center of the image projected by the reference projector P1 coincide, within a given tolerance (typically a pixel).

For convergence of the primary colors, which concerns one projector at a time, a black circle is projected onto a white background. We therefore have the superposition of a black circle on a green background, a black circle on a red background, and a black circle on a blue background. When the convergences are not good, we typically have a circle with bleeding colors or even three colored circles clustered on a white background.

In this case, all three components of the image (red, green, and blue) can be captured in one image.

Calculating the circle centers then gives the geometric positions of the respective centers of the three circles. With green as a reference, because it has the highest brightness, a square is displayed for the operator that represents the center of the green circle, and red and blue squares showing the respective positions of the red and blue circles centers on a considerably enlarged scale.

The operator performs the necessary adjustments to make the three primary images coincide.

Adjustments for more sophisticated imaging systems can be proposed that allow approaching good convergence at several locations in the image. For example, circles can be projected at the center and at the four corners of the screen, and possibly at the location where subtitles appear (at the bottom middle of the screen). The method in the meaning of the invention then provides a calculation and a display of the best conditions for each of the five positions.

If the alignment command cannot be carried out due to projector interface problems, an enlarged image of the position of the additional projector relative to the reference projector can be displayed, as well as the aiming accuracy achieved at the end of the alignment operation. Positioning systems generally do not permit obtaining alignments as accurate as the measurements provided in the meaning of the invention.

Figure 2:
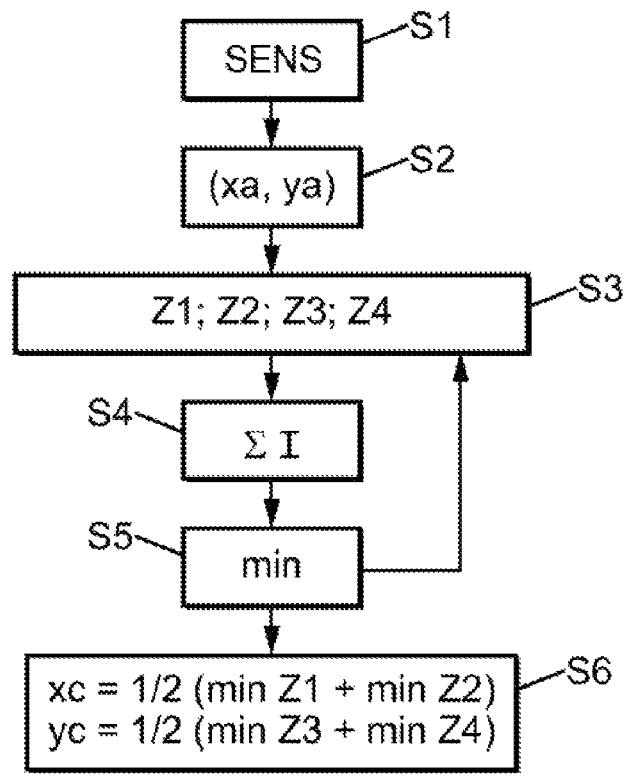
FIG. 2 illustrates the main steps of an example method within the meaning of the invention.
Figure 3:
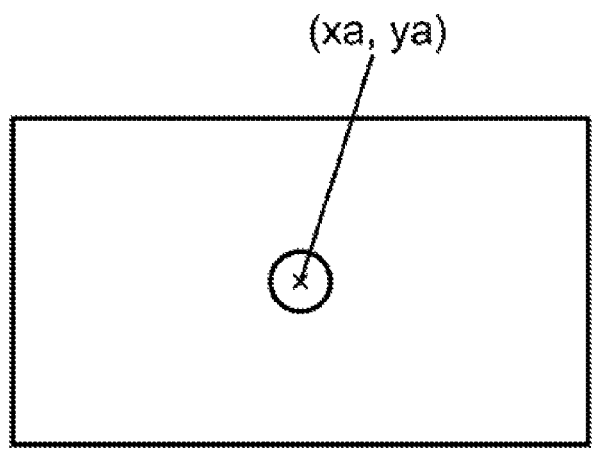
FIG. 3 illustrates an example of a projected pattern containing a circle.

We will now describe a method for the optimum alignment of several projectors, with reference to FIG. 2. It is possible to use only the green channel of the image, meaning that a black circle on a green background is provided as illustrated in FIG. 3. This avoids color bleeding if the convergence of the projectors is not optimum. In addition, we thus obtain a more accurate calculation based on the tests performed. Furthermore, green is the brightest color visually, which facilitates image capture for an operator.

Unlike visual alignment, light lines on a dark background are not used with such a pattern, but instead dark lines on a light background. Although the first case allows easy and immediate visual interpretation with human visual perception, it does not provide enough luminosity for digital image processing. The identification of dark dots on a light background is easier and more precise in image processing, particularly when considering electronic noise.

Tests have been conducted with various shapes, and in particular with a black square on a light background. Identifying the edges of a square is easy and provides immediate results. However, these results may be distorted in numerous ways:
  the sensor SENS may be almost imperceptibly rotated, in which case oblique lines detected by the sensor do not translate into a horizontal and a vertical line in the image,
  the projected image is never geometrically perfect, and perspective, pincushion, or barrel effects are observed, which distort the vertical and horizontal lines,
  perfectly uniform light is rarely achieved: areas surrounding the square vary in brightness, which distorts the position measurement of the edges.

The circle shape was chosen because its detection is very robust, particularly in Hough transform image processing.

Thus, in a first step of the method of FIG. 2, after the image is captured by the sensor SENS in step S1, a rough identification of the circle is implemented in Step S2.

Points that are missing because they are too close in value to the light background do not interfere with detection of the shape. Approximate knowledge of the circle radius further facilitates detection.

We thus obtain in step S2, after Hough transform, a first position (xa, ya) of the circle center whose accuracy is dependent on the parameters of the algorithm, primarily the pixel size of the sensor. This position is retained as an address, in integers, of a pixel on the sensor.

The accuracy of the detection is then improved as follows.

Figure 4:
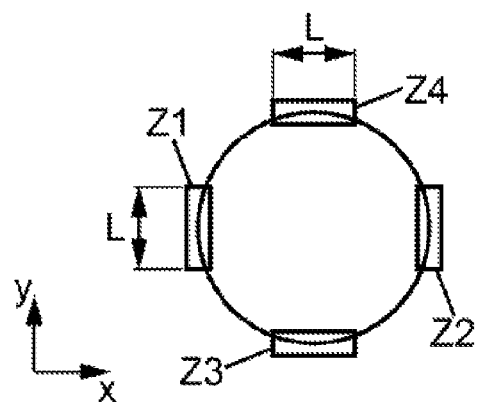
FIG. 4 illustrates the abovementioned regions, each containing a circular arc.

With particular reference to FIG. 4, using the knowledge of the circle radius and the position of its center as deduced from the image stored in memory MEM, four regions Z1, Z2, Z3 and Z4 are determined in step S3, corresponding to the (more or less) vertical regions at the left and right of the circle, as well as the (more or less) horizontal regions at the top and bottom, as represented in FIG. 4.

The luminous intensity values in each region are accumulated in step S4, by vertical projection for Z1 and Z2 or horizontal for Z3 and Z4 (Radon transform). A profile modeled by a curve (dotted line in FIG. 5) is obtained by Lagrange interpolation, in particular at the values of pixels having the lowest intensity sums (dotted curves in FIG. 5).

More specifically, the sum SL of the luminous intensities I of pixels is calculated along a column for the left region Z1 of length L (largest dimension of the rectangle formed by the region Z1), and this is done for each column along the x-axis of FIG. 4 until the width of region Z1 is reached (smallest dimension of rectangle Z1).

Figure 5:
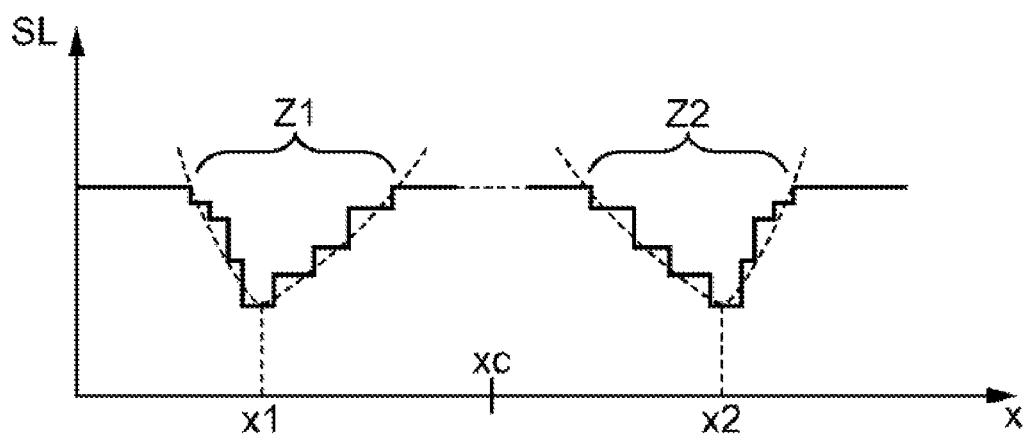
FIG. 5 illustrates the luminous intensity profiles associated with the regions, each having an extremum.

Thus, $SL(x) = \Sigma_y^L I(y)$ corresponds to the stepwise variation illustrated in FIG. 5. Here, x corresponds to a pixel abscissa and has an integer value (as do pixel addresses in general).

These variations are "smoothed" by Lagrange interpolation to obtain the two dotted curves of FIG. 5, in region Z1 and region Z2.

We thus have $SLm(x) = \widetilde{\Sigma_y^L I(y)}$ for this interpolation, with x∈Z1 and x∈Z2. Here, however, x takes actual values which are not necessarily integers.

Next, in step S5, we look for the position of the lowest point of each dotted curve in FIG. 5, rounded to the nearest tenth of a pixel.

We thus have: $x1 = \min_{x \in Z1}(SLm(x) = \widetilde{\Sigma_y^L I(y)})$ for the left region Z1, and $x2 = \min_{x \in Z2}(SLm(x) = \widetilde{\Sigma_y^L I(y)})$ for the right region Z2.

The midpoint between the two optimum points for the right and left regions gives a more accurate value xc for the abscissa of the circle center. The midpoint is used because each of the sides calculated for an arc region does not give a precise position of the edge of the circle.

Thus, in step S6 of FIG. 2, the abscissa xc of the circle center is given by xc=(x1+x2)/2.

The same operation is repeated with the top and bottom regions by calculating a horizontal Radon projection. This gives a more accurate value yc for the ordinate of the circle center, to the nearest tenth of a pixel, taking the midpoint between the optimum positions found.

Thus, yc=(y1+y2)/2, where $$y1=\min_{y\in Z3}(SLm(y)=\sum_x^T \overline{I(x)}) \text{ and } y2=\min_{y\in Z4}(SLm(y)=\sum_x^T \overline{I(x)})$$

Of course, the invention is not limited to the embodiments described above by way of example; it extends to other variants.

For example, the term "circle" as used above includes in general any closed concave curve for which we are determining the center. It may be a square (as noted above, even if the accuracy in measuring the center is less effective), or an ellipse, or an oval for which the center is to be determined.

Furthermore, rectangular regions have been described above as a possible exemplary embodiment. However, the regions may have other shapes (elliptical or circular, for example), in which case it is appropriate to average (and not simply to sum) the luminous intensities of the pixels in directions perpendicular to the radial direction (as the number of pixels varies from one average calculation to another).

The invention claimed is:

1. A method, implemented by computer means, of aligning on a first projection means at least a second projection means, the method comprising the steps of:
    activating the first and second projection means so that each one projects on a screen an image pattern comprising a circle on a uniform contrasting background,
    capturing an image of the projections by a sensor, and transmitting the projected image data to an analysis device,
    in the analysis device, identifying the centers of the respective circles of the projections and sending adjustment commands to the second projection means so that the circle center of the image projected by the second means coincides with the circle center of the image projected by the first means,
wherein the method includes a determination of the respective positions of said circle centers, comprising, for each circle, the following steps implemented by the analysis device:
    identifying at least a first and a second pair of projected image regions, each region in a pair containing a circular arc, and the regions in each pair being spaced apart by a maximum distance,
    determining, for each region, a spatial distribution profile of luminous intensity in a direction that is radial to the circle, in order to identify in said profile a luminous intensity extremum and thus deduce the spatial coordinates of a precise point corresponding to said intensity extremum,
    defining the spatial coordinates of the midpoint between the two precise points of the first pair and the midpoint between the two precise points of the second pair, in order to deduce the spatial coordinates of the circle center.

2. The method according to claim 1, wherein the circle of the projected images is black on a uniform colored background, and wherein a minimum luminous intensity is searched for in each of said profiles.

3. The method according to claim 2, wherein the background is primary green.

4. The method according to claim 1, comprising the steps of:
    successively activating the first projection means, with the coordinates being stored of the circle center identified in the image projected by the first means,
    then activating the second projection means, and comparing the coordinates of the circle center identified in the image projected by the second means with the stored coordinates of the circle center of the image projected by the first means, in order to define the adjustment commands for the second means.

5. The method according to claim 1, comprising a step of rough recognition of a circle, in order to identify the pairs of regions.

6. The method according to claim 5, wherein the rough recognition is performed by Hough transform.

7. The method according to claim 1, wherein the luminous intensity profiles are obtained by Radon projections.

8. The method according to claim 7, wherein the Radon projections are followed by Lagrange interpolations in order to obtain an extremum point for each profile.

9. The method according to claim 1, wherein:
    the regions of the first pair are located at the left and right sides of the circle, and the sum divided by two of the abscissas of the respective precise points of the regions of the first pair provides the abscissa of the circle center in a chosen coordinate system, and
    the regions of the second pair are located at the lower and upper sides of the circle, and the sum divided by two of the ordinates of the respective precise points of the regions of the second pair provides the ordinate of the circle center in the chosen coordinate system.

10. The method according to claim 1, wherein the luminous intensities of the pixels of each region, taken in a direction perpendicular to the radial direction, are averaged to construct said profile associated with the region.

11. The method according to claim 1, wherein the regions are rectangular and the luminous intensities of the pixels in each region, taken in the largest dimension of the rectangle forming the region, are summed to construct said profile associated with the region.

12. The method according to claim 1, wherein the first and second projection means are two projectors in stereoscopic cinematography.

13. The method according to claim 1, wherein the second projection means is arranged to project an image coincident with and superimposed on an image projected by the first projector, in particular to reinforce the brightness, and wherein the method is implemented for a collimation of the projections from said first and second projection means.

14. The method according to claim 1, wherein it comprises aligning at least a third projection means to the first and/or second projection means, with a repetition of the steps of the method.

15. The method according to claim 14, wherein the first and second projection means are two projectors in stereoscopic cinematography, and wherein four projection means are used for stereoscopic cinematography, with two projection means aligned to each other for each eye, and the pairs of projection means for each eye being further aligned to each other for the stereoscopic vision.

16. A non-transitory computer readable medium, storing instructions of a computer program, for the implementation of the method according to claim 1 when the program is executed by a processor.

17. A system for adjusting a second projection means so as to be aligned to a first projection means, comprising, for the implementation of the method according to claim 1:
- a device for controlling at least the second projection means so as to project onto a screen an image pattern containing a circle,
- a sensor for capturing a digital image of the projected image, and
- an analysis device connected to the sensor, for determining the position of the circle center in the projected image and comparing this position to a circle position determined in an image projected by the first projection means, so as to provide alignment adjustment commands for the second means based on said comparison.

* * * * *